UNITED STATES PATENT OFFICE.

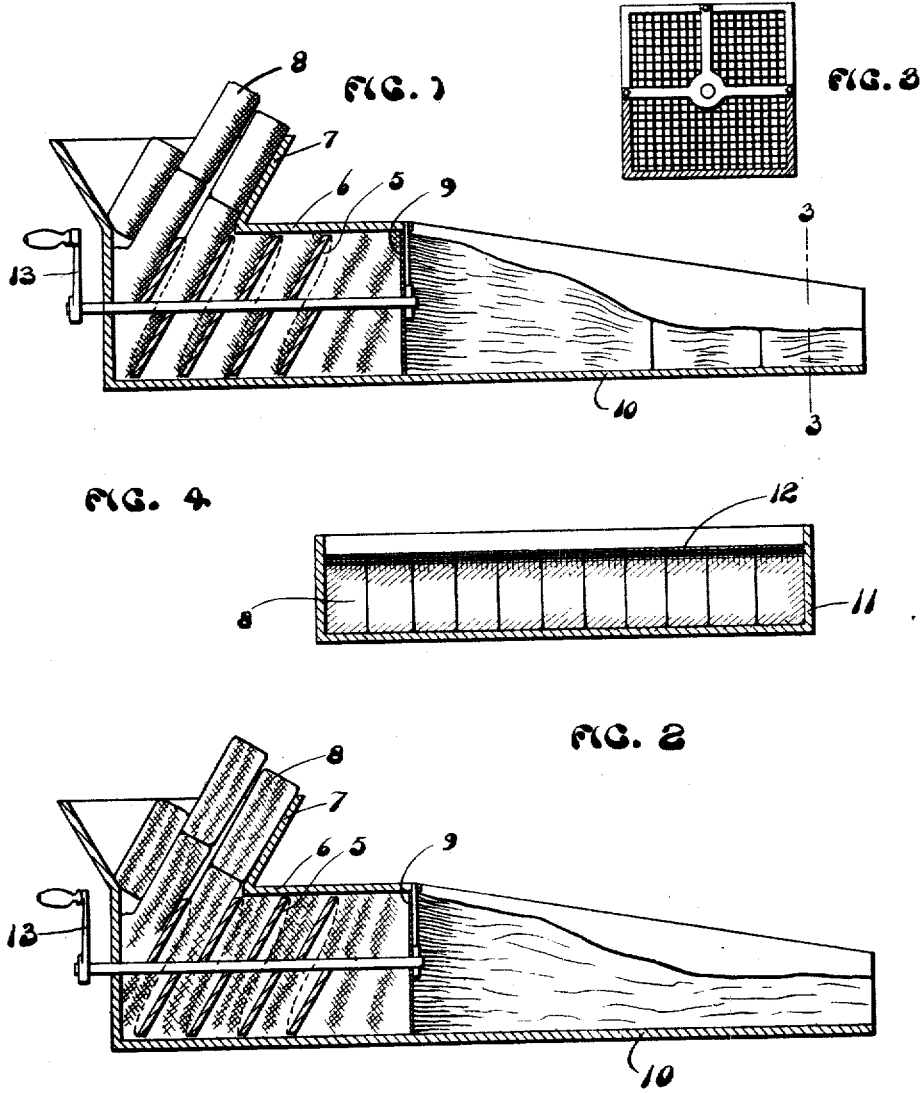

AUGUST RIESCH, OF CINCINNATI, OHIO.

MARBLEIZING ARTIFICIAL STONE.

1,012,016. Specification of Letters Patent. Patented Dec. 19, 1911.

Application filed October 12, 1910. Serial No. 586,590.

*To all whom it may concern:*

Be it known that I, AUGUST RIESCH, a subject of the Emperor of Germany, and resident of Cincinnati, county of Hamilton, and State of Ohio, have invented certain new and useful Improvements in Marbleizing Artificial Stone, of which the following is a specification.

This invention relates to artificial stone or marble, and has for an object to produce a process of marbleization or coloring the artificial stone, so that it represents marble and so that the colors are arranged artistically and naturally.

A further object is to produce a process for quickly and effectively coloring or marbleizing artificial stone or marble, and for introducing the coloring material into and through the material employed in forming the artificial stone.

These and other objects I attain by means of the process herein described.

In the drawings accompanying this application and forming a part thereof, I have illustrated an apparatus which may be employed in carrying forward the successive steps comprised in the process described as an embodiment of my invention.

Figure 1 is a sectional view of a conveyer, and illustrates one step in the process described as an embodiment of my invention. Fig. 2 is a sectional view corresponding to Fig. 1, and illustrates another step of the process. Fig. 3 is a section along line 3—3 of Fig. 1, in the direction of the arrows, and illustrates a screen, which forms a part of the apparatus illustrated in Figs. 1 and 2. Fig. 4 is a sectional view of a pan, which is employed in carrying forward the first step of the process herein described.

In carrying out my invention, I take advantage of the fact that plastic or wet coloring material will adhere or cling to metal or wood strips, and will be gradually disengaged from the strips and form veins of color, when the strips are forced or drawn through plastic material.

In the drawings, I have shown a mechanically actuated apparatus, which may be employed in carrying out my invention.

The apparatus consists of a screw conveyer 5, mounted in a casing 6, which is provided with a hopper 7, for receiving plastic material or compound 8, employed in the manufacture of artificial stone. A screen 9 is located on the casing 6, at the discharge end of the conveyer 5, and the conveyer is arranged to receive the compound 8 from the hopper, convey it through the casing 6 and force it through the screen 9. A trough 10 is shown as formed integrally with the casing 6, and is so located that it receives the plastic compound 8 discharged from the conveyer, after it has passed through the screen.

In carrying out my invention, I find it convenient to form a layer of the material or compound 8 in a pan 11, illustrated in Fig. 4. I then spread a layer of coloring material 12 in the pan and moisten the coloring material by spraying it with a suitable liquid. The moisture renders the coloring material plastic and causes it to adhere to the surface of the stone-forming compound 8. The coloring material may, of course, be applied to the compound 8, in a plastic condition, and the step of moistening it will then be omitted. After the coloring material 12 is in place on the compound 8, I divide the material in the pan 11 into sections and so introduce each section into the hopper 7 of the conveyer, that the coloring material 12, forming a part of the section, will be forced through the screen 9, by the conveyer, prior to the stone-forming material 8, which forms a part of the section.

In the drawings, I have illustrated the conveyer 6 provided with a crank 13, adapted to be operated by hand; this, however, is merely illustrated, and any suitable means may be employed for operating the conveyer. The conveyer 5 receives the sections cut from the material in the pan 11, and forces each section through the screen and into the trough 10. If the sections are delivered to the hopper continuously, the conveyer will deliver a continuous stream of plastic material through the screen, and the screen will cut this material into ribbons or long segments. In the operation of the conveyer, the plastic coloring material 12 of each section is first forced through the screen, and, consequently, a portion of the coloring material adheres to the wires or strips which form the screen, and this material is imparted to the material 8 as it is forced through the screen. The result is, that the material issuing from the screen 9 is divided into longitudinal segments or longitudinally extending ribbons and each segment or ribbon is coated with coloring material. In order to obtain a more general and natural distribution of the coloring material throughout the stone-forming compound, I pass it through the screen 9 a second time. In doing this, I first cut substantially equal segments from the material contained in the trough 10 and introduce them into the hopper 7 in such a manner, that the color veins will be cut transversely by the screen, when the material passes through the screen a second time.

In Fig. 2, I have illustrated the manner in which the segments from the trough 10 are introduced into the hopper 7, and it will be seen that the sections are introduced transversely to the conveyer, so that the color veins extend substantially at right angles to the axis of the conveyer. A portion of the coloring material is taken up by the wires or strips forming the screen, as the veins of color in the segments pass through the screen, and is imparted to the plastic material transversing the screen, and in this manner is more thoroughly distributed throughout the plastic material. The material may be forced through the screen as many times as is desired, and a number of different colors may be employed. After the desired marbleization or distribution of the color is accomplished, the material or compound 8 is formed in slabs or plates, and is allowed to dry or harden for use.

Various coloring material may be employed in carrying out my invention, and I may mention the following coloring material as an example of those that I have successfully used:—One part of oxid of iron, one to twenty parts of stone powder and magnesium oxid, and sufficient moisture to render the mixture plastic.

What I claim is:—

1. The process of imparting color to artificial stone, which consists in forming artificial stone compound into a layer, placing a layer of coloring material on said compound, then forcing the layer through a screen in such a way that the color material passes through the screen, prior to the compound.

2. The process of coloring or marbleizing artificial stone, which consists in forming the plastic stone-forming compound into a layer, placing a thin coat of color material on the surface of the layer, dividing the layer into segments and forcing the segments through a screen or net-work of wire or strips, so that the layer of color on each segment is forced through the screen, prior to the plastic material.

3. The process of coloring or marbleizing artificial stone, which consists in forming the artificial stone compound in a layer, spreading a thin coat of coloring material on the layer of compound, dividing the color covering compound into segments successively, forcing the segments through a screen, so that the layer of coloring material of each segment passes through the screen, prior to the compound on which it is located, cutting the mass into segments after it has passed through the screen, and forcing the segments transversely through the screen, so that the color veins formed in the segments are cut transversely by the meshes of the screen.

AUGUST RIESCH.

Witnesses:
C. H. BARTH,
WALTER F. MURRAY.